Aug. 27, 1940.   B. L. YORK   2,212,765
CONFECTION MOLD
Filed April 23, 1940
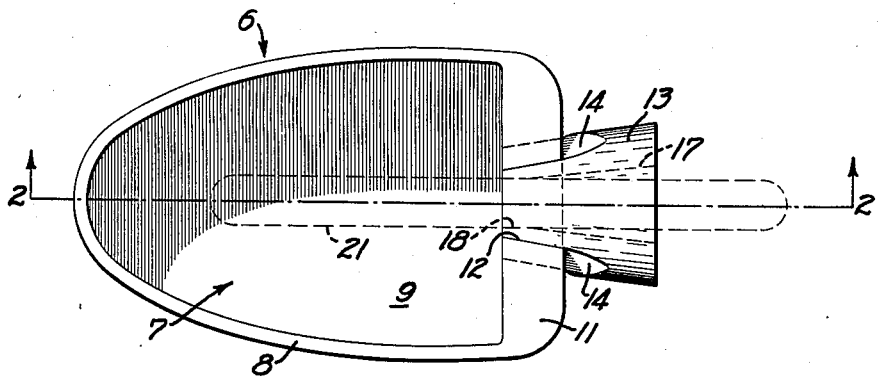
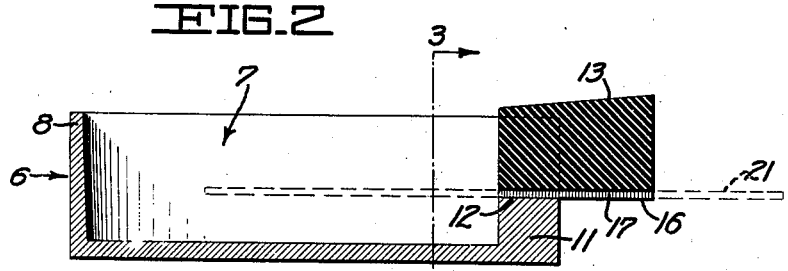
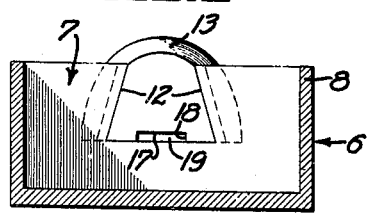   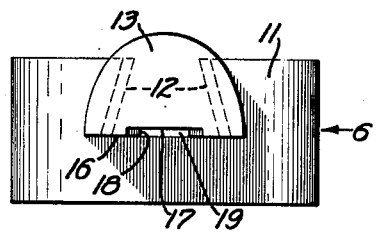
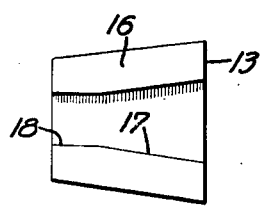
INVENTOR
Bertrand L. York
BY
Harry C. Schroeder
ATTORNEY Patented Aug. 27, 1940

2,212,765

UNITED STATES PATENT OFFICE 2,212,765

CONFECTION MOLD

Bertrand L. York, Piedmont, Calif.

Application April 23, 1940, Serial No. 331,218

3 Claims. (Cl. 107—19)

This invention relates to devices for molding confections of the lollypop type.

The herein described invention is an improvement in the mold structure disclosed in my prior application, Serial No. 315,049, filed January 22, 1940.

In the aforesaid prior application, I disclosed a body having therein a mold cavity surrounded by a continuous wall in which was provided a notch for receiving a stick-like handle which projected partly into the mold cavity and which would become embedded in material poured into the cavity so as to form a molded article of lollypop form. A stopper was provided which was insertible in the recess so as to tightly close the latter against leakage of fluid from the mold, and form a section of the wall surface of the cavity, and also to hold the handle in its proper position with relation to the mold body. It was found, in some instances, that after the fluid material, poured into the mold cavity, set or hardened, a little difficulty was experienced in loosening the stopper to permit its removal and to permit the molded article and its attached handle to be lifted as a unit from the mold. In some of these instances, the force, imposed laterally of the stopper necessary to loosen it and to work it out of the wall notch, was sufficient to cause loosening of the portion of the handle embedded in the frozen confection in the mold. It is an object of the present invention to provide means for obviating this danger of handle loosening when removing the formed article from the mold. Other objects and features of advantage will become apparent to those skilled in the art and will be brought out in the detailed description of the invention hereunto annexed.

Referring to the drawing:

Figure 1 is a top plan view of a mold incorporating the improvements of my invention.

Figure 2 is a longitudinal vertical sectional view of the mold. The plane in which the view is taken is indicated by the line 2—2 of Figure 1.

Figure 3 is a transverse vertical sectional view of the mold. The plane in which the view is taken is indicated by the line 3—3 of Figure 2.

Figure 4 is an end elevational view of the mold.

Figure 5 is a bottom plan view of the stopper.

In detail, I provide a mold which may be composed of material such as cast aluminum or any of the plastic materials, such as Bakelite, having a body 6 in which a mold cavity 7, of any desired form, is provided. A large portion of the wall 8, which borders and rises from the bottom 9, is made relatively thin, so as to facilitate transmisison of heat through the walls, and the remainder, forming the straight end wall 11, is made considerably thicker. In this thickened wall 11 is formed a dove-tailed notch 12 which tapers transversely of the wall, being wider at the outer surface of the wall than at the inner surface of the wall facing the mold cavity. The notch 12, opening at the upper surface of the wall 11, extends downwardly a distance equal to about half of the depth of the cavity.

Into the notch 12 is adapted to be pressed a stopper 13, preferably composed of soft rubber, which has a shape approximating an axially divided frustum of a cone whose peripheral surface is angularly related to its axis substantially equivalent to the angle of the vertical sides of the notch. The stopper is proportioned so that, when it is snugly in place in the notch 12, its smaller end will be substantially flush with the inner or cavity surface of the wall 11. Flats 14, formed on opposite sides of the stopper, provide surfaces of the latter which bear against the plane sides of the notch with sufficient pressure to form a water-tight seal between wall 11 and the stopper. The bottom flat surface 16 of the stopper will, as the latter is pushed into the notch, be forced downwardly against the bottom of the notch so as to form a water-tight seal between the bottom and the stopper. Formed in and extending longitudinally of the flat bottom surface 16 of the stopper, as is best shown in Figure 5, is a relatively shallow groove 17 which, at the smaller end of the stopper, is provided with a short narrow section composed of parallel sides 18, the remainder of the groove tapered and increasing in width as it approaches the larger end of the stopper. The groove should be at least about one and one-half times wider at the larger end of the stopper than at the smaller end thereof. When the stopper is in place in the mold notch 12, the groove 17, in conjunction with the bottom surface of the notch, forms a rectangular aperture 19 in which may be placed a handle 21, of complemental cross-sectional form, so that one end of the latter is positioned within the mold cavity. Moldable material, such as colored and flavored water, may be placed in the mold cavity and frozen or allowed to congeal so that it will form a substantially solid mass in which the end of the handle 21, lying within the cavity, is embedded. After freezing or solidification the lollypop thus formed may be separated from the mold by withdrawing the stopper 13 from the notch 12 and raising the projecting portion of the handle through the now open top of the notch.

Quite frequently the stopper 13 becomes firmly lodged in the notch 12 and considerable working or flexing thereof must be resorted to in order to free it from the mold body. In my above identified prior application I showed the stopper provided with a parallel-sided groove for the reception of the handle member 21. In the majority of cases, such a stopper may be readily separated from the mold to release the handle. However, in case the stopper should adhere or become frozen to the mold it will be seen that, since the handle member is a relatively snug fit in the stopper groove, any lateral flexing of the stopper, to free it from the notch 12, will impose a severe strain on the handle member which is often sufficient, if the mold is in the hands of a careless person, to cause loosening of the handle so that the latter is rendered useless. By providing the stopper of the present invention with a tapered groove, as shown in Figure 5, considerable lateral flexing of the stopper, before the sides of the groove engages the sides of the handle member, is permitted thereby removing the possibility of the user placing a bending strain on the handle during the act of working the stopper loose from the mold body.

Having thus described my invention in detail, what I claim as new and desire to secure by Letters Patent is:

1. In a mold of the class described, comprising a mold body having therein an upwardly opening cavity, for the reception of moldable material, surrounded by a continuous vertical side wall provided with a dove-tailed notch extending through said side wall, entering said cavity and having its bottom surface spaced from the top of said side wall, a stopper to be inserted in and to close said notch, said stopper having in a surface thereof a groove cooperative, when the stopper is engaged in said notch, with a surface of said mold body to form an aperture through which a member, lying within said stopper groove, may pass to enter said mold cavity, said stopper in a portion thereof being intimately engaged with said member and in another portion thereof being relatively free from said member so that a portion of said stopper may be freely moved relative to said member.

2. In a mold of the class described, comprising a mold body having therein an upwardly opening cavity, for the reception of moldable material, surrounded by a continuous vertical side wall provided with a dove-tailed notch extending through said side wall, entering said cavity and having its bottom surface spaced from the top of said side wall, a stopper to be inserted in and to close said notch, said stopper having in a surface thereof a groove cooperative, when the stopper is engaged in said notch, with a surface of said mold body to form an aperture through which a member, lying within said stopper groove, may pass to enter said mold cavity, said stopper groove, in a portion thereof, having a width substantially equivalent to the width of said member and in another portion thereof having a width appreciably in excess of that of said member.

3. In a mold of the class described, comprising a mold body having therein an upwardly opening cavity, for the reception of moldable material, surrounded by a continuous vertical side wall provided with a dove-tailed notch extending through said side wall, entering said cavity and having its bottom surface spaced from the top of said side wall, a rubber stopper to be inserted in and to close said notch, said stopper having in a surface thereof a groove of uniform depth and provided with angularly related sides, said stopper groove being cooperative, when the stopper is engaged in said notch, with the bottom surface of said notch to form an aperture through which a handle member, lying within said stopper groove, may pass to enter said mold cavity, and said handle member being in engagement with the said sides of the stopper groove only adjacent the narrower end of said groove.

BERTRAND L. YORK.